(12) United States Patent
Yamashita

(10) Patent No.: US 7,916,321 B2
(45) Date of Patent: Mar. 29, 2011

(54) DOCUMENT PROCESSING APPARATUS AND DOCUMENT PROCESSING METHOD

(75) Inventor: Masamichi Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/691,965

(22) Filed: Jan. 22, 2010

(65) Prior Publication Data

US 2010/0123935 A1    May 20, 2010

Related U.S. Application Data

(63) Continuation of application No. 11/001,749, filed on Dec. 1, 2004, now Pat. No. 7,675,636.

(30) Foreign Application Priority Data

Dec. 10, 2003    (JP) .................................. 2003-412215

(51) Int. Cl.
*G06F 3/12*    (2006.01)
*G06K 15/00*   (2006.01)

(52) U.S. Cl. ...................... 358/1.14; 358/1.13; 358/1.17

(58) Field of Classification Search ........ 358/1.13–1.18, 358/1.9, 3.26; 715/230, 233, 255, 273, 274, 715/277
See application file for complete search history.

(56) References Cited

U.S. PATENT DOCUMENTS

| | | | |
|---|---|---|---|
| 5,130,806 A * | 7/1992 | Reed et al. ..................... | 358/296 |
| 6,236,463 B1 * | 5/2001 | Cyman et al. ................. | 358/1.14 |
| 6,608,697 B1 * | 8/2003 | Schorr et al. ................. | 358/1.15 |
| 2004/0034834 A1 * | 2/2004 | Pirie et al. ..................... | 715/527 |
| 2004/0086155 A1 * | 5/2004 | Furukawa et al. ............ | 382/112 |
| 2005/0168768 A1 * | 8/2005 | Ito ................................ | 358/1.14 |

* cited by examiner

*Primary Examiner* — James A Thompson
(74) *Attorney, Agent, or Firm* — Canon USA Inc IP Division

(57) ABSTRACT

A document processing apparatus reads document data and carries out a preflight check. In the preflight check, the content of the document is interpreted page by page to determine resources that are needed for output. Then, it is determined for each page whether the resources needed for output are available in a printing system. If a resource that is not available is needed, a warning is issued for the page. If the resources are available, intermediate data for a printed output is generated for the page. Then, a result of the preflight check is output.

6 Claims, 9 Drawing Sheets

FIG. 4

| |
|---|
| BASIC I/O PROGRAM |
| OPERATING SYSTEM |
| APPLICATIONS |
| RELATED DATA |
| WORK AREA |

DOCUMENT PROCESSING APPARATUS AND DOCUMENT PROCESSING METHOD

CROSS-REFERENCE TO RELATED APPLICATIONS

This application is a Continuation of U.S. patent application Ser. No. 11/001,749 filed Dec. 1, 2004, which claims the benefit of Japanese Patent Application No. 2003-412215 filed Dec. 10, 2003, both of which are hereby incorporated by reference herein in their entirety.

BACKGROUND OF THE INVENTION

1. Field of the Invention

The present invention relates to document processing apparatuses and document processing methods. More specifically, the present invention relates to a document processing apparatus and a document processing method with which input of document data in Postscript (PS) or Portable Document Format (PDF) is received, the content of the document is checked, and then data in an intermediate format for output (intermediate data) is generated.

2. Description of the Related Art

Conventionally, for example, in a printing system that includes a computer and a printer, what is called a preflight check is carried out before an outputting process. In the preflight check, document data in PS, PDF, or other formats is input, and it is checked whether the document will be output correctly before printing or otherwise outputting the document.

According to the conventional art, however, when a preflight check is carried out, an interpreter (an interpretation process) is run in order to interpret document data. More specifically, the interpreter interprets document data to check whether resources needed for the document are provided in the printing system, and generates intermediate data for output. The intermediate data refers to, for example, data describing objects included in individual bands, i.e., areas of each page as divided by boundaries extending in parallel to a main scanning direction. The objects are described based on a grammar that can be interpreted by, for example, a printer. The intermediate data is sometimes referred to as DLC for short.

However, the intermediate data generated in the preflight check is not used for output. In an outputting process that is executed after completion of the preflight check, the interpreter is run again to generate intermediate data. As described above, the interpreter for processing document data is run twice, i.e., in the preflight check and in the outputting process, generating intermediate data each time. Thus, processing time for generating intermediate data in the preflight check is wasted, and the unneeded process could block or otherwise restrict other processes, so that the processing is not so efficient.

Japanese Patent Laid-Open No. 2001-005620 describes techniques for generating intermediate data. However, a preflight check is not carried out in the techniques. Furthermore, according to the techniques, intermediate data is generated even for data with which a document will not be output correctly, thus the processing could be wasted. Furthermore, according to the techniques, intermediate data is generated for all the pages, so that a large load could be imposed on a machine or the like when the number of pages is large.

SUMMARY OF THE INVENTION

In view of the related art described above, the present invention provides a document processing apparatus and a document processing method that generate intermediate data at different timing. According to setting, intermediate data is generated depending on a situation in a preflight check, and intermediate data is generated as needed at the time of an output, so that intermediate data is not generated uselessly, intermediate data is not doubly generated, a preflight check is carried out quickly, and a memory or an external storage device is used efficiently.

To this end, the present invention, in one aspect thereof, provides a document processing apparatus having resource information regarding resources that are available for outputting a document. The document processing apparatus includes: a resource determining unit for determining resources that are needed for outputting the document on a page-by-page basis, and for determining whether the resources that are needed for outputting the document are included in the resource information; and a first generating unit for generating intermediate data suitable for outputting for each page of the document for which it is determined by the resource determining unit that the resources that are need for outputting the page of the document are included in the resource information.

The document processing apparatus may further include an intermediate data determining unit for determining whether it is specified that intermediate data is not to be generated, wherein the first generating unit does not generate intermediate data when it is determined by the determining unit that it is specified that intermediate data is not to be generated.

The document processing apparatus may further include a client determining unit for determining whether the document processing apparatus is a client, and for specifying that intermediate data is not to be generated when it is determined that the document processing apparatus is a client.

The document processing apparatus may further include a display unit for displaying a preview of the document.

When it is determined by the resource determining unit that a resource that is not included in the resource information is needed for outputting a page of the document, the first generating unit may output a warning for the page.

The document processing apparatus may further include an intermediate page generation determination unit for determining whether intermediate data should be generated when intermediate data is not generated by the first generating unit; and a second generating unit for generating intermediate data based on the document data when the intermediate page generation determination unit determines that intermediate data should be generated when intermediate data is not generated by the first generating unit and intermediate data is not generated by the first generating unit.

The resource determining unit may carry out the determination for every page of the document. After the resource determining unit carries out the determination for every page of the document, the first generating unit, generates intermediate data for each page of the document for which it is determined by the resource determining unit that resources needed for outputting the page of the document do not include any resources that are not included in the resource information.

The present invention, in another aspect thereof, provides a document processing method that uses resource information regarding resources that are available for outputting a document. The document processing method includes: determining resources that are needed for output on a page-by-page basis; determining whether the resources that are needed for outputting each page of the document are included in the resource information; and generating intermediate data for each page of the document for which it is determined that the resource that are needed for outputting the page of the document are included in the resource information.

The present invention, in another aspect thereof, provides a computer program for allowing a computer having resource information regarding resources that are available for outputting a document, to execute a method as described above.

The present invention, in another aspect thereof, provides a document processing apparatus for interpreting document data and outputting a result of interpretation. The document processing apparatus includes: a determining unit for interpreting document data and determining whether a warning is issued; and a first generating unit for generating intermediate data based on the document data when it is determined by the determining unit that a warning is not issued, while not generating intermediate data based on the document data when it is determined by the determining unit that a warning is issued.

The first generating unit may be activated when an output request relates to printing.

The first generating unit may be activated when an output request relates to display.

The present invention, in another aspect thereof, provides a document processing apparatus for interpreting document data and outputting a result of interpretation. The document processing apparatus includes: a determining unit for interpreting document data and determining whether a warning is issued; and a first generating unit for generating intermediate data based on the document data. The first generating unit, in response to an output request relating to printing, generates intermediate data based on the document data when it is determined by the determining unit that a warning is not issued, while not generating intermediate data based on the document data when it is determined by the determining unit that a warning is issued. The first generating unit, in response to an output request relating to display, generates intermediate data based on the document data when it is determined by the determining unit that a warning is issued, while not generating intermediate data based on the document data when it is determined by the determining unit that a warning is not issued.

The present invention, in another aspect thereof, provides a document processing method for interpreting document data and outputting a result of interpretation. The document processing method includes: interpreting document data; determining whether a warning is issued; and generating intermediate data based on the document data. The intermediate data generation may be in response to an output request relating to printing, wherein intermediate data is generated based on the document data when it is determined that a warning is not issued, while intermediate data is not generated based on the document data when it is determined that a warning is issued. The intermediate data generation may be in response to an output request relating to display, wherein intermediate data is generated based on the document data when it is determined that a warning is issued, while intermediate data is not generated based on the document data when it is determined in the determining step that a warning is not issued.

The present invention, in another aspect thereof, provides a program product for executing a document processing method for interpreting document data and outputting a result of interpretation as described above.

Further features and advantages of the present invention will become apparent from the following description of embodiments (with reference to the attached drawings).

BRIEF DESCRIPTION OF THE DRAWINGS

FIG. 2 is a diagram schematically showing the construction of a client machine, a server machine, or the like.

FIG. 4 is a diagram showing a memory map of a RAM (random-access memory) in a computer during execution a process according to an embodiment of the present invention.

DESCRIPTION OF THE EMBODIMENTS

First Embodiment

A first embodiment of the present invention relates to a printing system that outputs a sheet of paper by a printer or the like. The printing system receives input of a PDF or PS document created by a creator, and prints the document on a paper medium. A "warning" herein refers to a warning that is issued when it is not possible to output data as specified by input data. In the printing system, for example, when input data in PS or PDF is to be output, a warning is not issued when all resources (fonts, a color space, etc.) intended by the creator of the input data, i.e., all resources specified in the input data, are available in an outputting device to be used (a printer in this embodiment). On the other hand, when the output involves use of even a single resource that is not specified, i.e., when an intended output is not possible, a warning is issued as to the resource.

Construction of the Printing System

Figure 1:
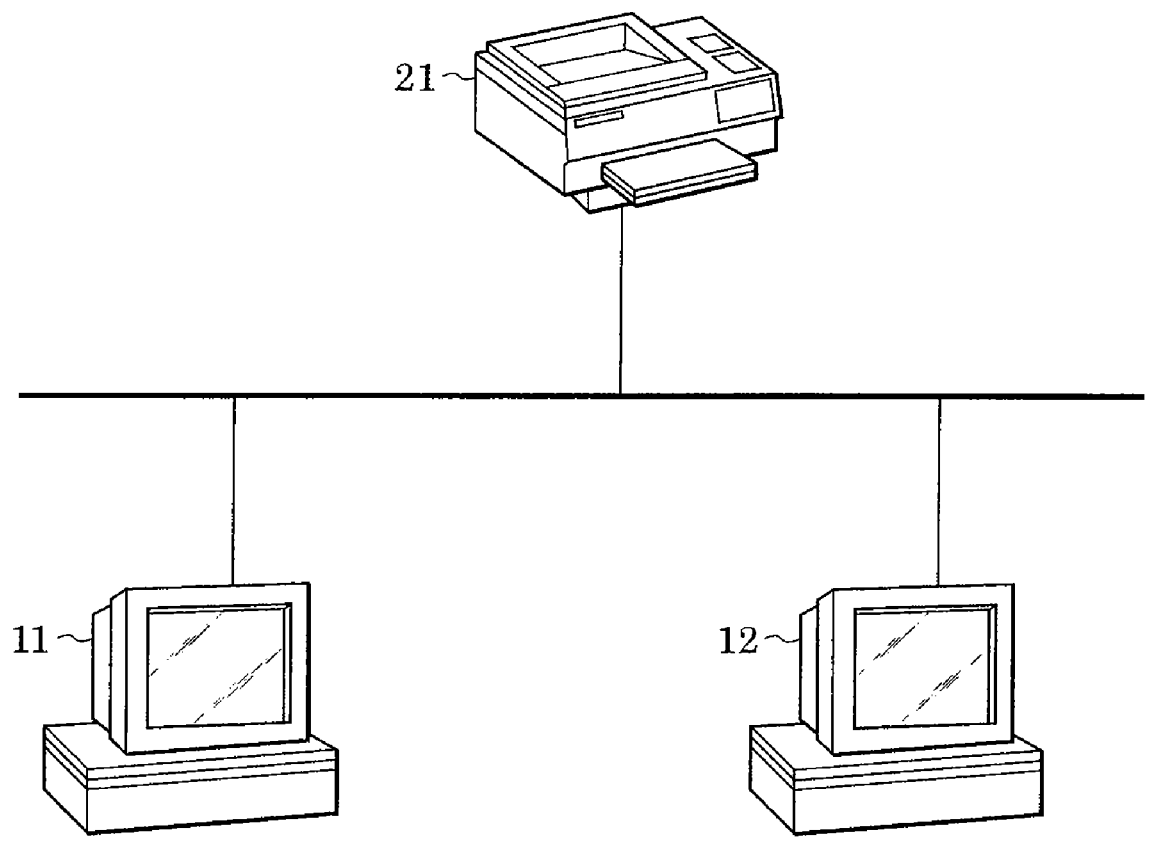
FIG. 1 is a block diagram showing the construction of a document processing system according to an embodiment of the present invention.

FIG. 1 is a block diagram of the printing system according to the first embodiment. In the printing system, computers 11 and 12 and a printer 21 are connected to a network. The number of computers and the number of printers are not limited to those in this example. Each of the computers 11 and 12 may be a client machine, a server machine, or other types of machine. Although the printer 21 is connected to the network in FIG. 1, alternatively, the printer 21 may be connected locally. The printer 21 may be any type of printer, such as a laser beam printer, a bubble-jet printer, or a thermal transfer printer.

Figure 2:
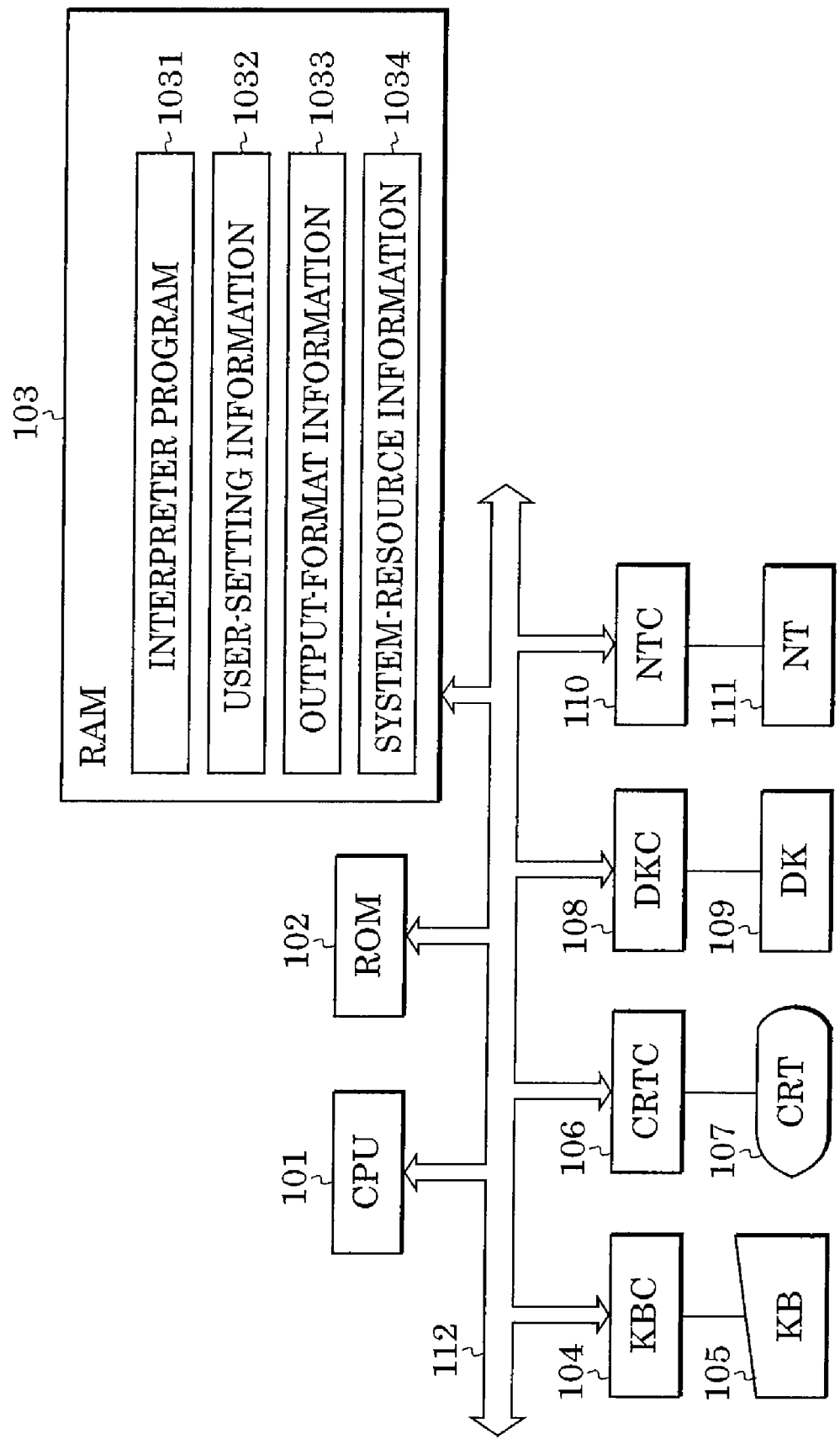

FIG. 2 is a block diagram schematically showing the construction of each of the computers 11 and 12. A system bus 112 allows data to be transferred among components. A central processing unit (CPU) 101 controls the entire apparatus and carries out operations. A read-only memory (ROM) 102 stores a program for booting the system, a basic I/O (input/output) program, and the like. A random access memory (RAM) 103 stores results of operations by the CPU 101, text data, graphic data, image data, and the like. The RAM 103 also temporarily stores programs such as applications loaded from an external storage device or the like. As will be described later, for example, an interpreter program 1031, user-setting information 1032, output-format information 1033, and system resource information 1034 are loaded in the RAM 103, and are run, referred to, updated, or otherwise used.

A keyboard controller (KBC) 104 receives data input from a keyboard (KB) 105, and sends the data to the CPU 101. A display controller (CRTC) 106 reads data for display from the RAM 103 or other parts, and transfers the data to a display (CRT) 107, which displays the data received from the CRTC 106.

A disk controller (DKC) 108 controls accesses to an external storage device (DK) 109. The DK 109 may be, for example, a floppy disk (FD), a hard disk (HD), or a compact disk-read-only memory (CD-ROM). The HD stores, for example, PS or PDF documents, programs (interpreters) for interpreting the documents, programs for rendering the documents into bitmap images or the like. Application programs relating to this embodiment, and programs, data, and the like associated therewith, are supplied from an external storage device, such as a floppy disk or a CD-ROM.

A network controller (NTC) 110 controls a network (NT) 111. In the construction shown in FIG. 1, the computer is connected to the network via the NTC 110, and is thus connected to a network-enabled printer.

Figure 3:
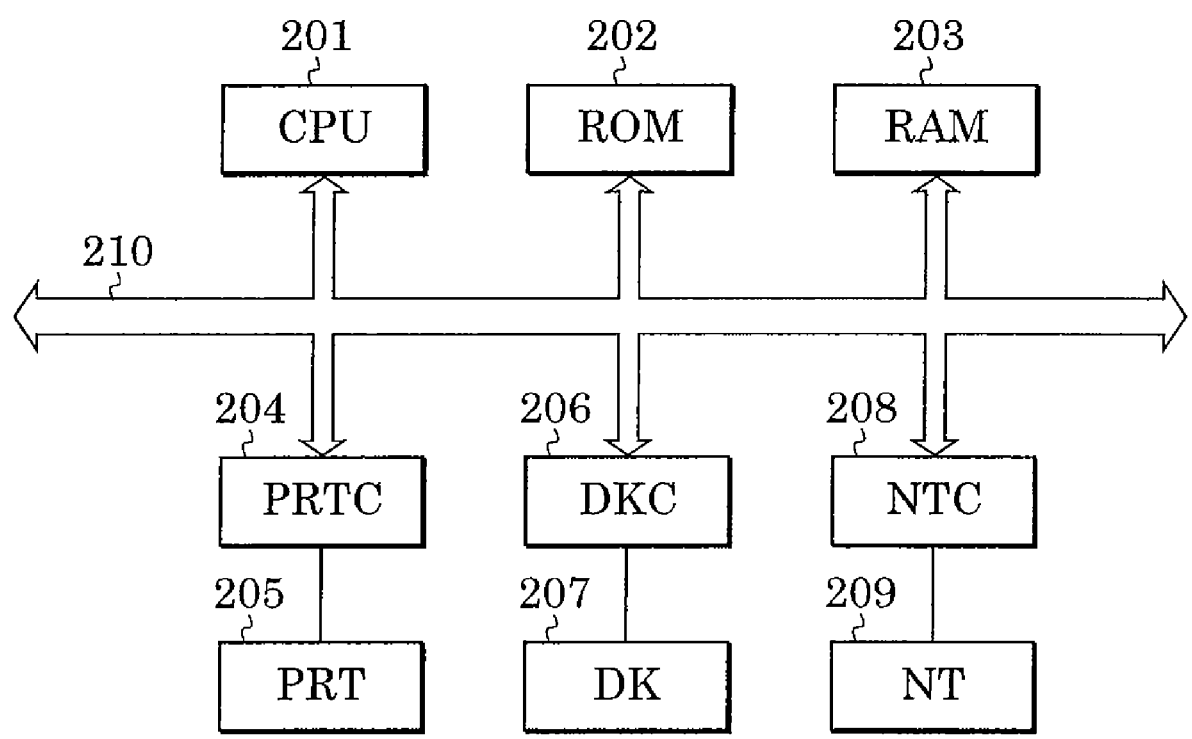
FIG. 3 is a diagram schematically showing the construction of a printer.

FIG. 3 is a block diagram schematically showing the construction of the printer 21 shown in FIG. 1. A system bus 210 allows data to be transferred among components. A central processing unit (CPU) 201 executes processing needed for printing according to a program stored in a read-only memory (ROM) 202, using a random access memory (RAM) 203 as a work area. The ROM 202 also stores font data and the like as well as the program. A disk controller (DKC) 206 controls an external storage device (DK) 207. The DK 207 may be, for example, a floppy disk (FD) or a hard disk (HD). In some cases, the DK 207 also stores programs and font data and the like, similarly to the ROM 202.

A printer controller (PRTC) 204 outputs print signals to a printer engine (PRT) 205.

A network controller (NTC) 208 controls a networking device (NT) 209 to exchange data with, for example, a computer 11, 12 shown in FIG. 1.

FIG. 4 is a diagram showing a memory map of the RAM 103, shown in FIG. 2, at the time of processing in this embodiment. A basic I/O program is read into the RAM 103 by a system booting program stored in the ROM 102. Furthermore, application programs, related data, and the like are installed from the external storage device 109 to, for example, a hard disk, and when power is turned on, the application programs, related data, and the like are loaded from the hard disk to the RAM 103 for execution. Although the description is given in the context of a hard disk, it is possible to load programs, related data, and the like from a floppy disk, a CD-ROM, or the like to the RAM 103 for execution.

Procedure of Preflight Check

Next, the operation of the printing system according to this embodiment will be described in detail with reference to flowcharts shown in FIGS. 5 and 6. The operation is an interpretation of a document by the computer 101 or the computer 102. It is assumed herein that the operation is executed by the computer 101. In this embodiment, similarly to the related art, the procedure of outputting a document is such that a preflight check is carried out before generating output data. According to the embodiment, however, processing is executed in such a manner as to avoid doubly generating output data. First, an operation during a preflight check will be described with reference to FIG. 5.

In step S501, settings that are made of the printing system and stored as user-setting information, for example, in the RAM 103. The settings may be made, for example, by a user via a user interface. The settings include, for example, selection of a device (e.g., a printer) that is to be used for output after a preflight check, whether a device font (a font provided in the printer) is to be used for output, and whether a color space of the device is to be used for output.

In step S502, document data is read according to instructions for a preflight check of the document. The document data is read when a preflight check for the document data is requested, for example, from a user interface of an application or the like. Thus, step S501 may be executed asynchronously from output of the document. The document to be read is in a format supported by the interpreter in this embodiment, such as PS or PDF.

In step S503, in response to the request for a preflight check in step S502, interpretation of the document is started. The document data is interpreted in step S504 and subsequent steps by the procedure described below based on the format of the document data. The document data is constructed according to rules defined by the standard of PS, PDF, or other formats. The interpreter holds the rules, for example, in the form of a grammar dictionary. The document data is sequentially read page by page with reference to the grammar dictionary, thus identifying resources and the like specified by the document.

Step S504 is the start point and step S508 is the end point of an interpretation loop. In the interpretation loop, the document that is to be interpreted is processed page by page until the number of remaining pages of the document to be interpreted becomes zero.

In step S505, the document subject to the preflight check is actually interpreted page by page. Also, in step S505, output-format information of each page of the document being interpreted is obtained and is held as information used for the preflight check. The output-format information includes, for example, fonts, color profile, orientation of the document, and sheet size. For example, in document data, the size and position of a text string is specified together with a font type to be used. When an image object is included, a color profile is sometimes specified in document data. Thus, the document data is parsed to extract information regarding resources to be used, which is stored as output-format information.

Furthermore, system resource information regarding resources of the printing system, which is contrasted with the output-format information, is also obtained before the preflight check. The content of the system resource information is updated when, for example, a printer included in the system is changed or a new resource such as a font is installed. The resources of the system are registered as system resource information on a device-by-device basis. Thus, it is possible to determine whether a particular resource is provided in a specific device by referring to the system resource information. For this purpose, the system resource information and the output-format information are held in a memory, a hard disk, or the like in such a manner that the information can be compared with each other, for example, by using common codes between codes representing setting parameters and codes representing contents of settings.

In step S506, the user-setting information set in step S501 is referred to, and the system resource information obtained in advance is compared with the output-format of each page of the document, obtained in step S505, in order to check whether it is possible to obtain an output as specified in the output-format information, by an outputting device specified in the user-setting information. For example, when the user-setting information specifies that a device font (a font provided in an outputting device such as a printer) is to be used, it is checked whether the font included in the output-format information for the page (i.e., the font to be used for the page) is available in the device specified in the user-setting information. If it is determined that the font to be used is not included in device fonts, it is not possible to output the page with the right font (i.e., the font specified in the output-format information), and for example, the page is output using another font (an alternative font). That is, the document is not output as specified by the output-format information. The result of the check is stored in a memory or the like, and a warning for notifying a user of the check result is issued. The check result is also referred to when generating intermediate data.

On the other hand, when it is specified in the user-setting information that a device font is not to be used, a font that is installed on a computer that is generating intermediate data, e.g., the computer 101, is used to output the document. Thus, when a font that is not installed on the computer is used in the document, it is not possible to output the document as specified in the output-format information, e.g., the font is replaced by another font. Thus, a warning for notifying the user of that effect is issued.

The above description also applies to other resources such as color profile and image resolution as well as fonts. That is, resources needed to output each page of a document subject to a preflight check, i.e., resources included in the output-format information of the page, are compared with resources included in the system resource information for each device according to the user-setting information specified by the user. When a resource is missing, it is determined that it is not possible to output the page as specified by the output-format information. As for a resource for which a device to be used is not specified, it is determined that the resource is not missing as long as the resource exists in any one of the devices available.

When it is determined that a warning is not issued, i.e., the document can be output correctly as specified in the output-format information, the procedure proceeds to step S507. On the other hand, when a warning is issued, the procedure proceeds to step S508. The reason why the procedure proceeds to step S507 for generating intermediate data when a warning is not issued is that when a warning is not issued in a preflight check before outputting such as printing, the document is to be output correctly so that the document need not be edited.

In step S507, intermediate data for output, such as data in a page description language (PDL), is generated based on information interpreted in step S505. The intermediate data generated is stored in a memory or the like. Alternatively, the intermediate data may be stored in an external storage device, such as a hard disk or a floppy disk. The method of storage is not particularly limited. Furthermore, information is attached so that it is possible to identify to which page of which document the intermediate data is related. The information may be attached in the form of an ID, a path name, or in any other form.

Figure 5:
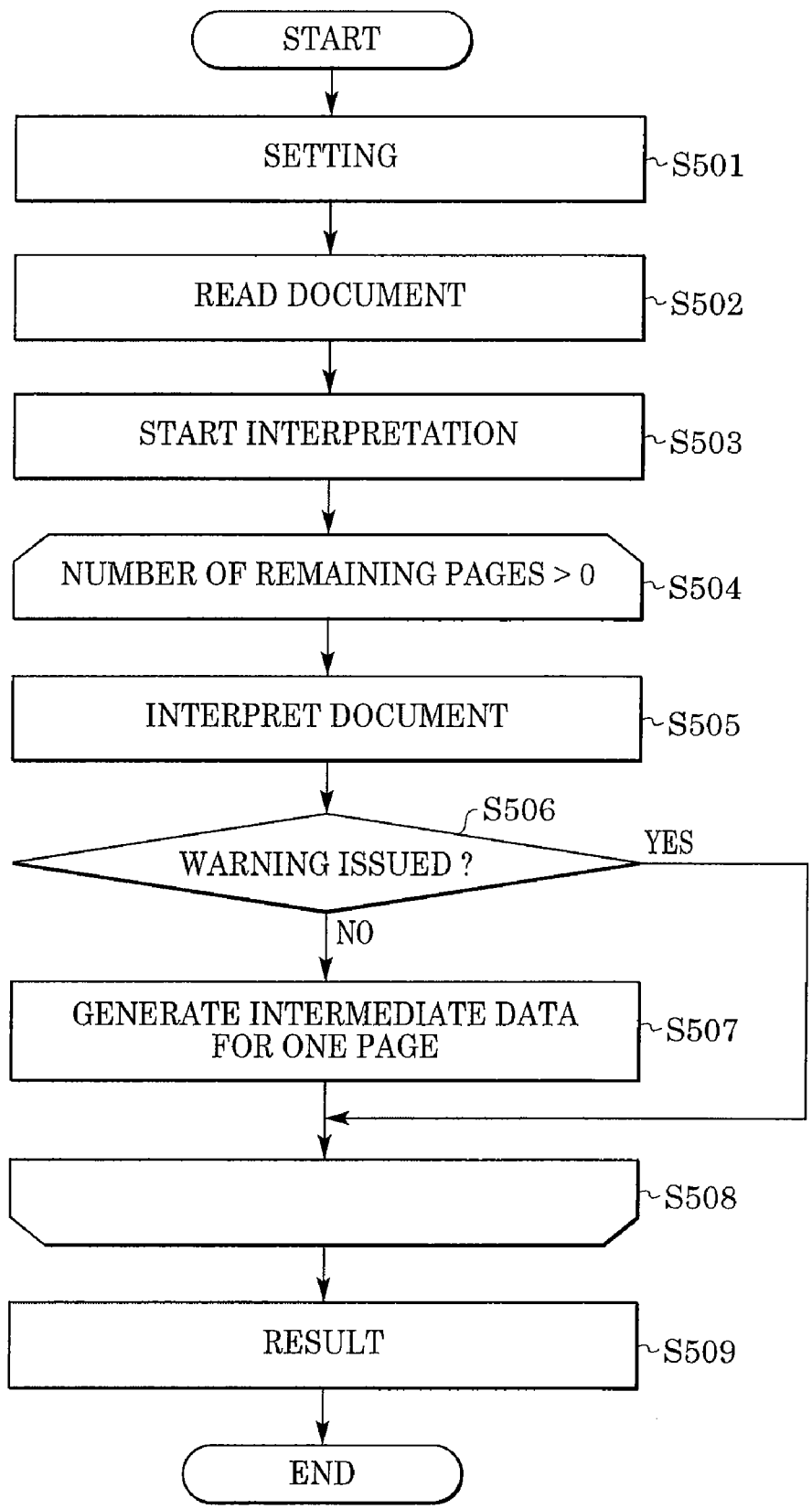
FIG. 5 is a flowchart according to a first embodiment of the present invention.

The flowchart in FIG. 5 shows a case where intermediate data is generated page by page. Alternatively, intermediate data (DLC) may be generated after interpreting all of the pages. In that case, referring to FIG. 5, step S507 is executed after step S508, and intermediate data for all of the pages is generated in step S508.

Step S508 is the end point of the interpretation loop. When the interpretation is finished for all of the pages, in step S509, a result of the preflight check is returned. That is, when the procedure shown in FIG. 5 is called by a parent procedure, a check result (e.g., the presence or absence of a warning, or the content of a warning when a warning is issued) is passed as a parameter. Furthermore, a warning screen is displayed or a warning sound is output to the user via a user interface or the like.

In this manner, intermediate data is generated for pages for which a warning is not issued.

Procedure of Outputting Process

Next, a process that is executed in response to an output request will be described with reference to FIG. 6. An output request is input from a user to the printing system after a document is edited with regard to an item for which a warning is issued in a preflight check, or when a document is to be output disregarding a warning.

In step S510, a request for outputting a document is received from a user via a user interface or the like, and an output is started. In step S511, the interpreter is requested to start interpretation according to the output request. Step S512 is the start point of an interpretation loop. The loop is repeated until the number of remaining pages of the document to be interpreted becomes zero.

In step S513, actual interpretation is started. In step S514, it is determined whether intermediate data for a page to be interpreted has been generated in step S507 during a preflight check. The procedure proceeds to step S516 if intermediate data has been generated, and the procedure proceeds to step S515 if intermediate data has not been generated. Steps S513 and S514 may be executed in the reverse order so that step S513 for interpretation and step S515 for generating intermediate data are executed for pages for which intermediate data has not been generated (i.e., intermediate data is absent). This saves useless interpretation. The intermediate data generated in step S515 is merged with intermediate data generated in step S507 shown in FIG. 5 in order of pages.

In step S515, intermediate data is generated for pages for which intermediate data has not been generated in the preflight check shown in FIG. 5. Step S516 is the end point of the interpretation loop. In step S517, the intermediate data generated is sent to an outputting device such as a printer. Then, the printer prints and outputs the document. In the printer, a printer controller generates image data based on the intermediate data received, and a printer engine prints an image on a sheet based on the image data.

By the processing described above, the printing system according to this embodiment avoids generating duplicate data in two processes, i.e., in a preflight check and in generating intermediate data. Accordingly, processing time for carrying out a preflight check and then generating intermediate data is reduced, so that the efficiency of usage of system resources is improved.

Second Embodiment

The first embodiment is an example where an output request relates to printing. In an output system that involves a preflight check, in some cases, timing for generating intermediate data differs between a preview for checking an output on a user screen and an output to a printer or the like. A second embodiment of the present invention which relates to a case of a preview is described next. Since the construction, memory map, and the like are the same as those in the first embodiment, descriptions thereof are not repeated here. Furthermore, the second embodiment is also similar to the first embodiment in that system resource information of the printing system is obtained by a computer prior to a procedure shown in FIG. 7.

Procedure of Preflight Check

Now, the second embodiment will be described with reference to a flowchart shown in FIG. 7. First, a preflight check will be described. In step S601, for example, a user makes settings and the settings are held as user-setting information. The settings herein are output settings including selection of a device to be used for output after the preflight check, whether a device font is to be used for output, and the like, similar to the first embodiment. However, since this embodiment relates to outputting a preview to a display or the like, a device assumed for output is chosen in the setting of a device to be used for printing. Furthermore, it is also set whether only a result of the preflight check is to be output.

In step S602, a document is read. The document is read when, for example, a preflight check is requested, for example, from a user interface of an application or the like. The document that is read is a PS document, a PDF document, or the like.

In step S603, the interpreter starts interpretation of the document in response to the request for a preflight check in step S602.

Step S604 is the start point of an interpretation loop. The document that is to be interpreted is processed page by page, and the loop is continued until the number of remaining pages of the document to be interpreted becomes zero.

In step S605, the document subject to the preflight check is actually interpreted page by page. Also, output-format information of each page of the document being interpreted, such as a font, color, orientation, and size of the document, is obtained, which is held as information used for the preflight check.

In step S606, the user-setting information input in step S601 is referred to, and it is determined whether it is specified that only a result of the preflight check is to be output. If it is specified that only a result of the preflight check is to be output, the procedure proceeds to step S609. If it is specified that preview data is to be output as well as a result of the preflight check, the procedure proceeds to step S607.

In step S607, the user-setting information set in step S601 is referred to, and the output-format information for each page of the document, obtained in step S605, is compared with the system resource information to check whether the document is to be output according to the information of the document by the device set in step S601. For example, when it is specified by the user in step S601 that a device font is to be used, if a font that is used in the document is not present in the device selected by the setting, it is not possible to output the document with the right font, and for example, an alternative font is used instead. Thus, it is not possible to output the document as specified, so that a warning is issued. On the other hand, when it is specified that a device font is not to be used, a font that is installed on, in this example, the computer 101 shown in FIG. 1 is to be used. When a font that is not installed on the computer is used in the document, it is not possible to output the document as specified, e.g., the font is replaced with an alternative font, so that a warning is issued. Similarly, when it is determined that a warning is issued, i.e., when there is a possibility that the document is not output correctly, based on information such as color or image resolution as well as fonts, the procedure proceeds to step S608.

When a warning is not detected, the procedure proceeds to step S609. When a warning is detected, the procedure proceeds to step S608 in which intermediate data is generated. This is because when a warning is detected in a preflight check for a preview, there is a possibility that a document is not output correctly and the user should be allowed to check the preview of what is invalid.

In step S608, intermediate data for output, such as PDL data, is generated based on the information interpreted in step S605. The intermediate data generated is stored in a memory or the like. Alternatively, the intermediate data may be stored in an external storage device, such as a hard disk or a floppy disk. The method of storage is not particularly limited. Furthermore, information is attached so that it is possible to identify to which page of which document the intermediate data is related. The information may be attached in the form of an ID, a path name, or in any other form.

Figure 7:
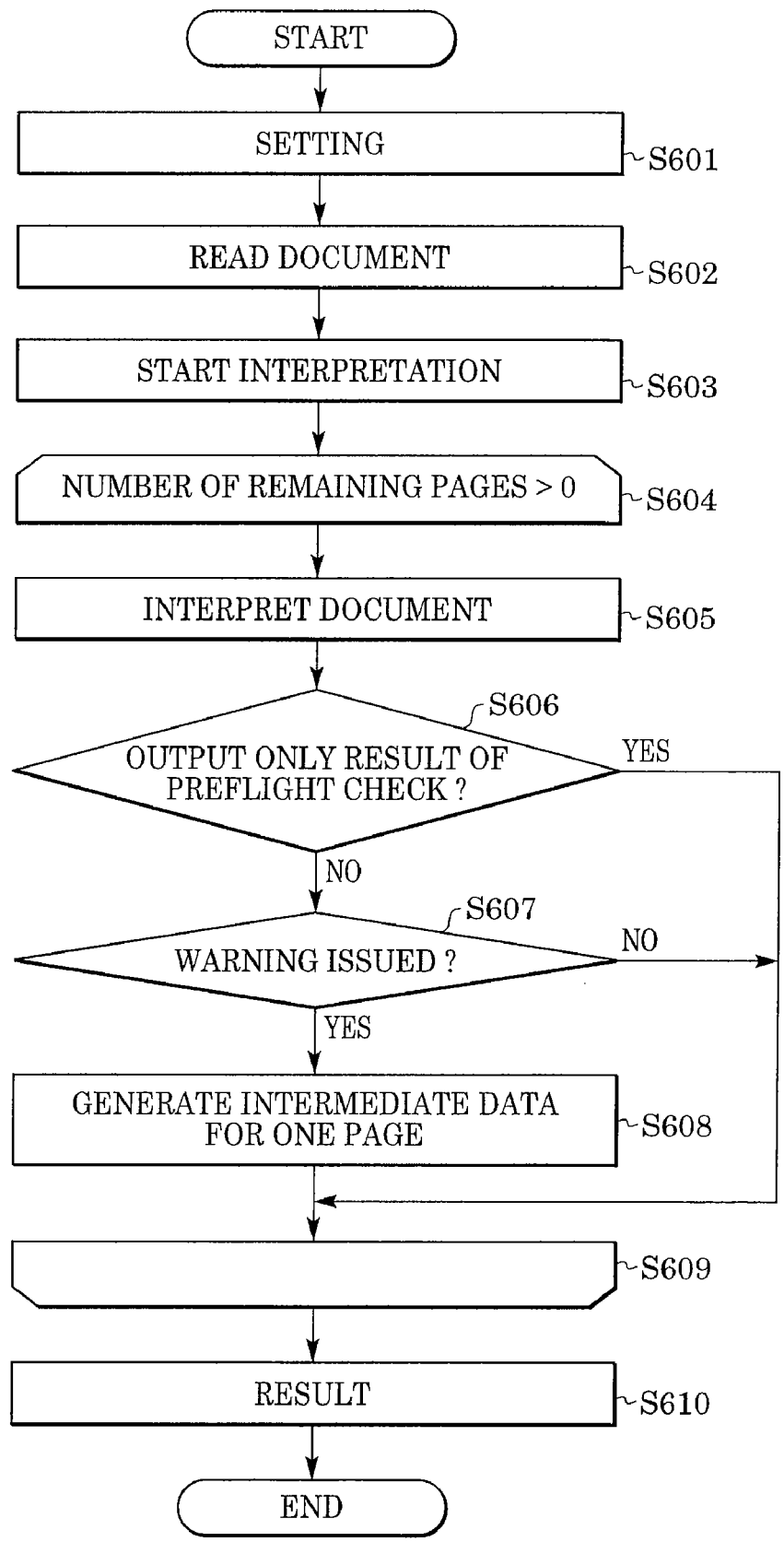
FIG. 7 is a flowchart according to a second embodiment of the present invention.

Although the flowchart shown in FIG. 7 shows a case where intermediate data is generated page by page, alternatively, DLC may be generated after interpreting all of the pages. In that case, referring to FIG. 7, step S608 is executed after step S609.

Step S609 is the end point of the interpretation loop. In step S610, a result of the preflight check is returned.

The procedure described above is the same as that shown in FIG. 5 except in that it is determined in step S606 whether only a result of the preflight check is to be output, and in that a preview is displayed in step S610. As described above, when it is not specified that only a result of the preflight check is to be output, intermediate data is generated for pages for which a warning is issued.

Procedure of Outputting Process

Figure 8:
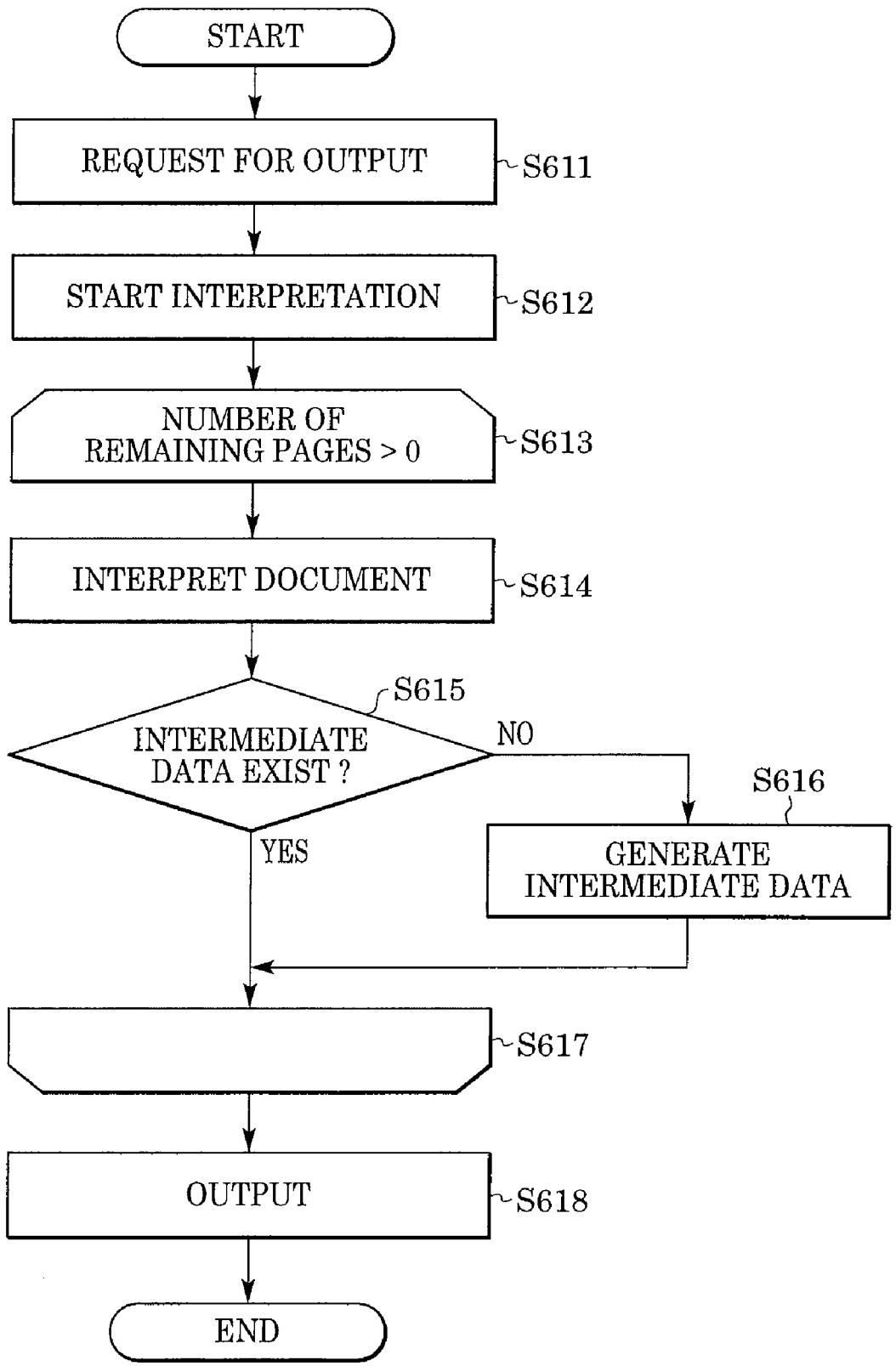
FIG. 8 is a flowchart according to the second embodiment.

Next, a process that is executed in response to an output request will be described with reference to FIG. 8. In step S611, an output is started in response to an output request. In step S612, interpretation is started in response to the output request.

Step S613 is the start point of an interpretation loop. The loop is continued until the number of remaining pages of the document to be interpreted becomes zero.

In step S614, actual interpretation is started. In step S615, it is determined whether intermediate data of a page to be interpreted has been generated in step S607 during a preflight check. If intermediate data has been generated, the procedure proceeds to step S617. If intermediate data has not been generated, the procedure proceeds to step S616. In step S616, intermediate data is generated.

Step S617 is the end point of the interpretation loop. In step S618, the document is output by an outputting device such as a printer based on the intermediate data generated.

Figure 6:
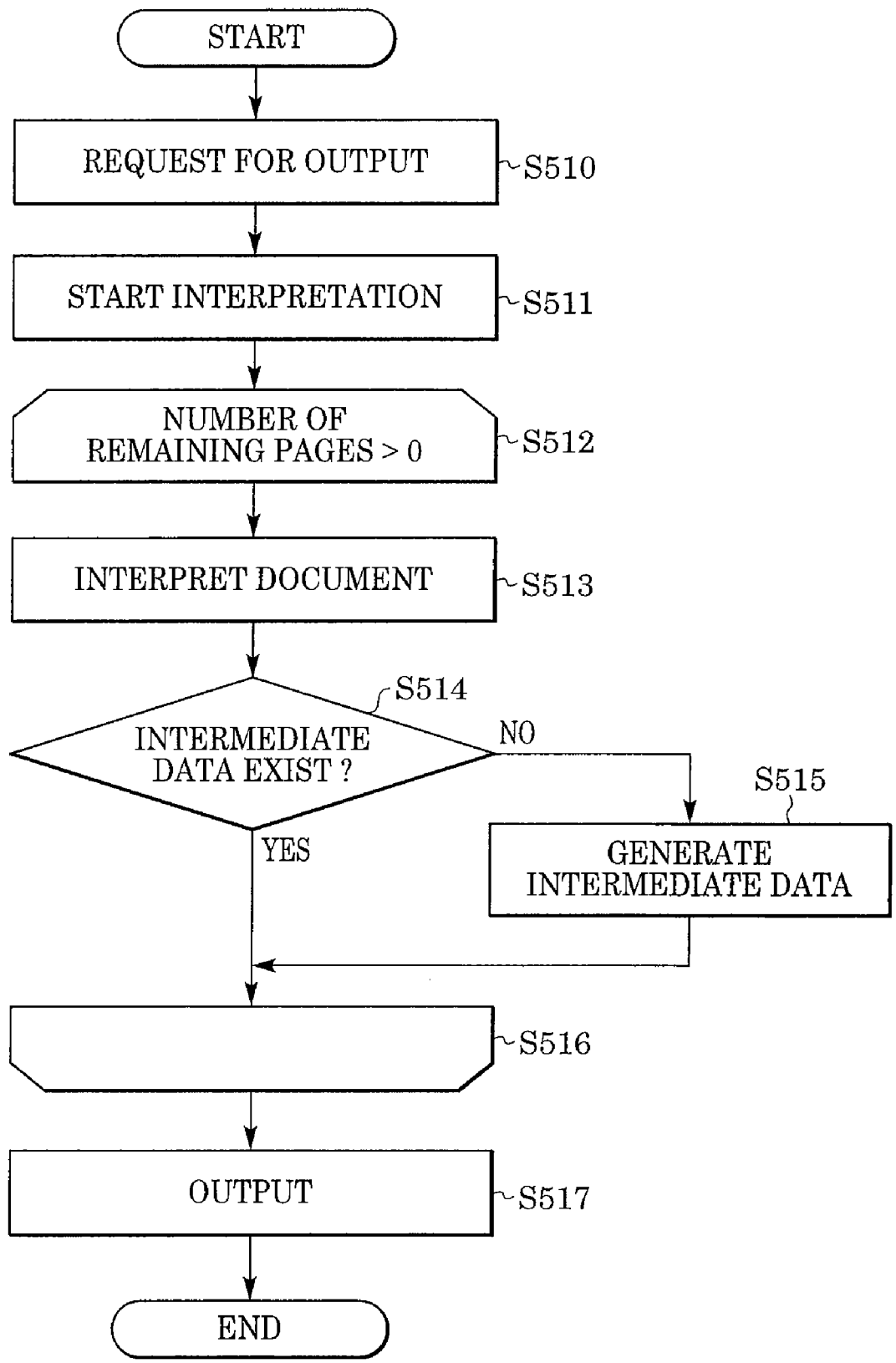
FIG. 6 is a flowchart according to the first embodiment.

The procedure of the output process is the same as that shown in FIG. 6. By the processing described above, the printing system according to this embodiment avoids generating duplicate data in two processes, i.e., in a preflight check and in generating intermediate data. Thus, processing time for carrying out a preflight check and generating intermediate data is reduced, and the efficiency of usage of system resources is improved.

Furthermore, by allowing a user to specify before a preflight check that only a result of the preflight check is to be output, intermediate data is not generated in the preflight check, so that the preflight check is carried out quickly.

Third Embodiment

Next, a third embodiment of the present invention, which is a modification of the first embodiment, will be described. In the first and second embodiments, in a preflight check (FIGS. 5 and 7), matching of output-format information and system resource information is checked page by page to determine whether a warning is issued (or whether a warning is not issued), and intermediate data is generated for pages for which a warning is not issued.

The third embodiment is similar to the first and second embodiments in that matching of output-format information and system resource information is checked page by page. In the third embodiment, however, the presence or absence of a warning is stored page by page, and intermediate data is generated simultaneously for pages for which a warning is not issued after the matching is checked for all the pages. The data generated in the preflight check and used for generating intermediate data is temporarily stored until the process of generating intermediate data. The result of the preflight check is output, for example, via a user interface. By outputting the result of the preflight check before generating intermediate data, intermediate data can be generated in parallel with user operations such as checking by the user of the result of the preflight check or editing of the document based on the result of the preflight check. Thus, the processing speed as perceived by the user is further improved.

Fourth Embodiment

Next, a fourth embodiment of the present invention, which relates to a combination of the first and second embodiments, will be described with reference to FIG. 9.

Figure 9:
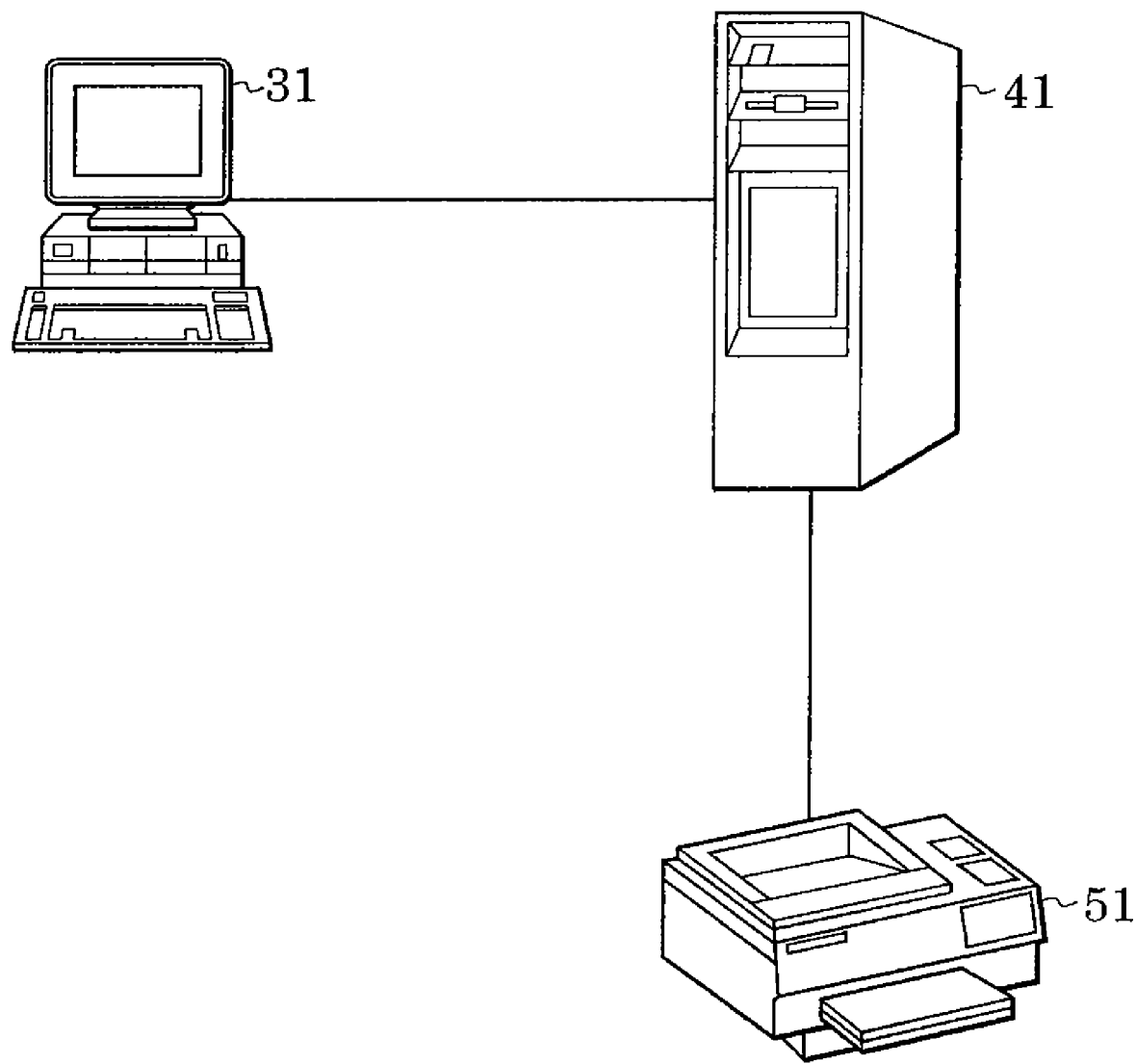
FIG. 9 is a diagram showing a system construction according to a third embodiment of the present invention.

Referring to FIG. 9, a system according to the fourth embodiment includes a client machine 31, a server machine 41, and an outputting device 51. The first embodiment relates to an example where a preflight check is carried out and intermediate data is generated in response to a request for outputting a document. In the fourth embodiment, the processing is executed by the server machine 41 shown in FIG. 9. In this embodiment, the result of a preflight check is returned to the client 31 that has issued an output request. More specifically, the client 31 executes the procedure shown in FIG. 7 to display a preview. The server 41 executes the procedures shown in FIGS. 5 and 6 to carry out a preflight check and to generate intermediate data. That is, at the client 31, a user creates document data, and the document data is input to the server machine 41. The server machine 41 carries out a preflight check and returns a result of the preflight check to the client 31. The server machine 41 also generates intermediate data. The intermediate data is input to the outputting device 51, and is printed and output. That is, at the client machine 31, a document is created, and a preview is displayed. At the client machine 31, it is specified that only a result of a preflight check is to be output. At the server machine 41, input of the document data is received, a preflight check is carried out, and the document data is output.

A computer determines whether the construction of the printing system is that shown in FIG. 1 or that shown in FIG. 9. When the construction is that shown in FIG. 9, it is possible to determine which component of the system the computer corresponds to and to determine which process is to be executed. This setting, i.e., whether only a result of a preflight check is to be output at a client (determined in step S606 shown in FIG. 7), may be made by a user, or may be made when a computer is determined as a client at the time of installation of the interpreter. According to the result, when the computer is a client, the procedure shown in FIG. 7 is executed for document data to be output. When the computer is a server, the procedures shown in FIGS. 7 and 8 are executed on an input document. Accordingly, intermediate data is not doubly generated even in a client/server system.

As described above, according to the embodiments described above, intermediate data is generated as required based on the presence or absence of a warning. Thus, generating intermediate data uselessly can be avoided and a result of a preflight check can be returned quickly. Furthermore, by avoiding generating intermediate data uselessly, a memory, an external storage device, or the like is used efficiently, and quick operation is allowed for editing or printing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A document processing apparatus comprising:
    a check unit configured to output a check result of interpreted document data without generating intermediate data when outputting the check result without generating the intermediate data is specified, and to determine whether or not a target page includes a warning when outputting the check result with generating the intermediate data is specified and to output the check result of document data interpreted with generating the intermediate data of the target page when the target page is determined to include the warning and to output the check result of interpreted document data without generating the intermediate data of the target page when the target page is determined not to include the warning; and
    an output unit configured to determine whether the intermediate data for the target page is generated, and to output the generated intermediate data for the target page to an output device when the intermediate data for the target page is determined to be generated and to generate the intermediate data for the target page and to output the generated intermediate data for the target page to the output device when the intermediate data for the target page is determined not to be generated.

2. The document processing apparatus according to claim 1, further comprising a specifying unit configured to specify whether to output the check result with generating the intermediate data or without generating the intermediate data.

3. A document processing method comprising:
    outputting a check result of interpreted document data without generating intermediate data when outputting the check result without generating the intermediate data is specified, and determining whether or not a target page includes a warning when outputting the check result with generating the intermediate data is specified and outputting the check result of document data interpreted with generating the intermediate data of the target page when the target page is determined to include the warning and outputting the check result of interpreted document data without generating the intermediate data of the target page when the target page is determined not to include the warning; and
    determining whether the intermediate data for the target page is generated, and outputting the generated intermediate data for the target page to an output device when the intermediate data for the target page is determined to be generated and generating the intermediate data for the target page and outputting the generated intermediate data for the target page to the output device when the intermediate data for the target page is determined not to be generated.

4. The document processing method according to claim 3, further comprising specifying whether to output the check result with generating the intermediate data or without generating the intermediate data.

5. A computer-readable storage medium storing computer-executable instructions for causing a computer to execute a method comprising:
    outputting a check result of interpreted document data without generating intermediate data when outputting the check result without generating the intermediate data is specified, and determining whether or not a target page includes a warning when outputting the check result with generating the intermediate data is specified and outputting the check result of document data interpreted with generating the intermediate data of the target page when the target page is determined to include the warning and outputting the check result of interpreted document data without generating the intermediate data of the target page when the target page is determined not to include the warning; and determining whether the intermediate data for the target page is generated, and outputting the generated intermediate data for the target page to an output device when the intermediate data for the target page is determined to be generated and generating the intermediate data for the target page and outputting the generated intermediate data for the target page to the output device when the intermediate data for the target page is determined not to be generated.

6. The computer-readable storage medium according to claim 5, further comprising specifying whether to output the check result with generating the intermediate data or without generating the intermediate data.

* * * * *